United States Patent [19]

Sturt

[11] 3,725,375

[45] Apr. 3, 1973

[54] POLYMERIZATION PROCESS

[75] Inventor: Alan Charles Sturt, Guildford, England

[73] Assignee: BP Chemicals Limited, London, England

[22] Filed: May 14, 1970

[21] Appl. No.: 37,334

[30] Foreign Application Priority Data

May 19, 1969 Great Britain..................25,418/69

[52] U.S. Cl. .260/92.8 W, 260/29.6 CM, 260/878 R, 260/884, 260/885, 260/899
[51] Int. Cl. ............................C08f 3/30, C08f 15/32
[58] Field of Search.....................260/880, 92.8, 884

[56] References Cited

UNITED STATES PATENTS

| | | | |
|---|---|---|---|
| 3,370,105 | 2/1968 | DeBell et al. | 260/880 |
| 3,436,440 | 4/1969 | Abe et al. | 260/880 |
| 3,562,359 | 2/1971 | Gelman | 260/879 |
| 3,546,323 | 12/1970 | Hwa et al. | 260/879 |
| 3,663,655 | 5/1972 | Sturt | 260/880 R |

FOREIGN PATENTS OR APPLICATIONS 1,087,390  10/1967  Great Britain....................260/928

Primary Examiner—Harry Wong, Jr.
Attorney—Lorimer P. Brooks, Alfred L. Haffner, Jr. and Harold Haidt

[57] ABSTRACT

Process comprising mixing a vinyl chloride polymer latex with vinyl chloride, destroying the latex emulsifying agent which is of the acid salt type, so that the polymer particles pass into the vinyl chloride and polymerizing the latter, preferably under suspension polymerization conditions.

6 Claims, No Drawings

POLYMERIZATION PROCESS

The present invention relates to vinyl chloride polymer compositions and particularly to a process for the production of such compositions by polymerizing vinyl chloride containing preformed vinyl chloride polymeric material.

It is known that useful vinyl chloride polymer compositions are obtained by blending one vinyl chloride polymer with another, different vinyl chloride polymer, e.g., a suspension polymer with an emulsion polymer.

An object of the present invention is to provide an improved technique for the production of such polymer compositions. A further object is to provide improved vinyl chloride polymer compositions.

According to the present invention the process for the preparation of a polymer composition comprises mixing a vinyl chloride polymer in the form of an aqueous latex stabilized by means of a carboxylic acid salt emulsifying agent with monomeric material consisting essentially of vinyl chloride, destroying the emulsifying agent without substantially altering the size of the vinyl chloride polymer particles, allowing particles to pass into the monomeric material and polymerizing the monomeric material with said particles dispersed therein.

Any vinyl chloride polymer that can be prepared in the form of an aqueous latex stabilized by means of carboxylic acid salt emulsifying agent can be used in the process of the present invention. Many such vinyl chloride polymers are known and mostly they contain more than 50 percent by weight and usually more than 75 percent by weight of polymerized vinyl chloride. Polyvinyl chloride and copolymers of vinyl chloride and up to 20 percent by weight of the copolymerizable material give good results.

The vinyl chloride polymer must be in the form of a stable aqueous latex, i.e., it is distributed throughout a continuous aqueous phase as finely divided particles which are stabilized and therefore do not coalesce or settle out because of the presence in the aquous phase of the acid salt emulsifying agent. Such aqueous latices of vinyl chloride polymers are well known and are usually prepared by the well known emulsion polymerization technique.

The polymeric material is stabilized by means of a carboxylic acid salt emulsifying agent. The agent has to be destructible, i.e., convertible to an ineffective form, so that it does not interfere with the operation of the second stage of the process. The emulsifying agents may be represented by the formula R.COOX where R is a large organic radical attached to the carboxyl salt group COOX. When a relatively strong acid (HA) i.e., an acid that is stronger than the acid from which the emulsifying agent is obtained, is added to the emulsifying agent the following reaction occurs:

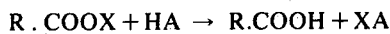

R . COOX + HA → R.COOH + XA

The free acid R.COOH is not an emulsifying agent and thus acidification destroys the carboxylic acid salt type emulsifying agents. In this system the pH of the system can be reduced gradually and this gives a controlled hydrolysis of the emulsifier. This ability for gradual diminution of the emulsifying power of the agent is of value in ensuring that the size of the polymeric material particles is not substantially altered during their passage into the monomeric phase according to the process of the present invention. It is also possible to destroy such emulsifying agent by diluting the latex with water which causes hydrolysis of the salt and the conversion of the emulsifying agent to the non-effective free acid form. The preferred emulsifying agents are water soluble salts of saturated fatty acids containing from eight to 20 carbon atoms, e.g., the alkali metal and ammonium salts of lauric, stearic, palmitic and myristic acids and mixtures thereof. These preferred emulsifying agents can be destroyed by adding acid to the system. Alternatively they can be destroyed by the addition of heavy metal (e.g., calcium, barium, cadmium and tin) salts to the system. These have the advantage of converting the acid salt emulsifying agents to useful lubricants and stabilizers. Examples of other suitable carboxylic acid salt emulsifying agents are the rosin acid salts, e.g., alkali metal or ammonium salts of disproportionated rosin acids and oleic acid.

The monomeric material consists essentially of vinyl chloride. However, it may contain a minor proportion by weight of other monomers that are copolymerizable with the vinyl chloride. When the monomeric material is to be polymerized under suspension polymerization conditions it is of course necessary to choose any copolymerizable compound so that the monomeric material can be so polymerized. Generally it is found that polymers and copolymers having a glass transition temperature above 20°C can be formed by suspension polymerization.

Examples of monomeric materials that can be copolymerized with vinyl chloride either in the production of the latex or in the second stage polymerization are acrylonitrile; vinyl acetate; olefins such as ethylene, propylene, isobutene and 4-methyl pentene-1; acrylate and methacrylate esters, e.g., methyl methacrylate; and fumarate and maleate esters. Preferably the comonomer used in the second stage polymerization does not amount to more than 20 percent by weight of the monomeric material.

The aqueous vinyl chloride polymer latex and the monomeric material may be mixed together while the emulsifying agent is destroyed. Alternatively the emulsifying agent can be destroyed before the monomeric material is added. Care must be taken when the emulsifying agent is destroyed to ensure that no coagulation of the vinyl chloride polymer particles occurs. If this is done the polymer particles pass into the organic phase without substantial change in size. Agglomeration of the particles may occur to form agglomerates in the monomeric material. However, in such agglomerates the identity of the individual latex polymer particles is retained and therefore the process is according to the present invention.

A protective colloid may be present in the system while the emulsifying agent is destroyed in order to assist the passage of the vinyl chloride polymer particles into the monomeric phase without substantial alteration of their size. The protective colloids used in this way act at the interface of the monomeric material and the polymeric material and therefore are of the organic type. Examples are polyvinyl alcohols and cellulose ethers.

The polymerization of the monomeric material may be brought about by any convenient means. For example, the monomeric material containing the dispersed particles may be separated from the aqueous phase and then polymerized by known mass polymerization techniques. Most suitably, however, the monomeric material is subjected to known suspension polymerization procedures in the presence of the aqueous phase of the vinyl chloride polymer latex. The fact that the emulsifying agent is destroyed means that its concentration in the aqueous phase is low enough not to give rise to emulsion polymerization and thus there should be no loss of product in the aqueous phase as emulsified material.

The polymerization may be initiated before or after the destruction of the emulsifying agent, but it is preferred that the destruction is completed before polymerization commences and thus the chance of the formation of unwanted emulsion polymer is reduced.

If the polymerization is to be effected under suspension polymerization conditions any of the known suspension stabilizer systems for vinyl chloride polymerization may be employed. Such suspension stabilizer systems can contain suspending agents of the organic or inorganic type and can be water soluble or insoluble. Examples of suitable organic suspending agents are polyvinyl alcohol, partially hydrolyzed polyvinylacetates, salts of styrenemaleic anhydride copolymers, gelatin, cellulose ethers such as methyl cellulose, hydroxypropyl methyl cellulose and hydroxyethyl cellulose. Examples of suitable inorganic suspending agents are sparingly soluble metal phosphates such as hydroxy apatite. Mixtures of organic and inorganic suspending agents and of water soluble and insoluble suspending agents can be used. If the suspending agent employed is conventional, for example a water soluble organic agent such as polyvinyl alcohol, it is suitably present in an amount in the range 0.005–1.0 percent by weight of the monomeric material employed and an inorganic suspending agent such as hydroxy apatite is suitably present in an amount in the range 0.05–1.0 percent by weight of the monomeric material employed.

The suspending agent or the suspension stabilizer system can be added either before or after the destruction of the emulsifying agent.

The efficiency of the suspension stabilizer can be increased by the well known technique of including buffers and/or wetting agents in the system. It is important that the amount of wetting agent should not be so great as to cause emulsification of the monomeric materials. Examples of suitable wetting agents include anionic surface active agents such as sodium caproate and sodium oleate, organic sulphates and sulphonates such as long chain alkyl sulphates and sulphonates, alkyl aromatic sulphonates, arylalkyl polyether sulphonates and sodium salts of alkyl phosphates.

After the emulsifying agent has been destroyed in the sense that it is no longer present in sufficient quantity to give rise to emulsion polymerization, there may still be a sufficient quantity of the agent present to increase the efficiency of any suspending agent employed in the final polymerization.

Conventional components of vinyl chloride polymerization systems can be present in the polymerization step of the present invention, e.g., polymerization initiator systems, molecular weight modifiers and the like. These are chosen according to the requirements of the monomeric material being polymerized. Similarly if suspension polymerization conditions are to be employed conventional phase ratios of organic to aqueous phases can be employed.

It will be readily appreciated that the quantity of vinyl chloride polymer that can be introduced into the monomeric material is limited by the need to obtain a polymer in monomer suspension system that can be subsequently polymerized. Generally the polymer originally present in aqueous latex form does not constitute more than 50 percent by weight of final product.

A particular advantage of the vinyl chloride polymers of the present invention is that they possess low fusion times as measured in the Brabender Plasticorder. Moreover they improve the fusion times of conventional polyvinyl chloride resins when mixed with them over a wide range of proportions. As little as 10 percent by weight can markedly improve the fusion time of a conventional resin. It is believed that this property is due to the distribution of the carboxylic acid derived from the emulsifying agent on the surfaces of the original latex particles.

The vinyl chloride polymers of the present invention have good plasticizer up-take and have a lower "fish eye" content, lower die-swell and show more rapid banding on a mill than conventional vinyl chloride polymers.

The following examples illustrate the process of the present invention. The parts by weight (pbw) bear the same relationship to the parts by volume (pvb) as do grams to milliliters:

Example 1

The following ingredients were employed:

| | |
|---|---|
| Vinyl chloride | 700 pbw |
| Distilled water | 2,786 pbw |
| Polyvinyl chloride latex- emulsifying agent, ammonium stearate — solids content, 33% - particle size, 0.05 to 0.3microns | 21 pbw |
| polyvinyl alcohol (Elvanol 50–42) | 1.75 pbw |
| Aqueous acetic acid (10% w/w) | .1 pbv |
| Lauroyl peroxide | 2.0 pbw |

The polyvinyl alcohol was dissolved in the distilled water and the latex was added to the solution. The acetic acid solution was slowly added to the stirred solution and the mixture was poured into a stainless steel reactor. The lauroyl peroxide was added and the reactor closed, purged and evacuated. The vinyl chloride was sucked into the reactor. The mixture was stirred at 700 r.p.m. and heated to 60°C for 6 hours. The mixture was cooled and vented to atmosphere. The product was filtered, washed in the filter and dried in a vacuum oven. Microscopic examination showed that the particle size ranged from 100 to 1,000 $\mu$. The product had good plasticizer up-take.

Example 2

The following ingredients were employed:

| | |
|---|---|
| Vinyl chloride | 530 pbw |
| Distilled water | 2,460 pbw |
| Polyvinyl chloride latex- emulsifying agent, ammonium stearate — solids content, 33% | |

- particle size, 0.05 to 0.3
  microns. 510 pbw
Polyvinyl alcohol (Elvanol 50-42) 7 pbw
Aqueous acetic acid (10% w/w) 23 pbv
Lauroyl peroxide 2 pbw The procedure was the same as that adopted in Example 1. Microscopic examination of the dry product indicated the particle sizes lay between 400 and 600 $\mu$.

Example 3

Vinyl chloride 350 latex-emulsifying
Distilled water 2,210 pbw
Polyvinyl chloride latex-
  emulsifying agent, ammonium
  stearate — solids content, 33%
  - particle size, 0.05 to 0.3
  microns. 940 pbw
Polyvinyl alcohol (Elvanol 50-42) 7 pbw
Aqueous acetic acid (10% w/w) 40 pbv
Lauroyl Peroxide 2 pbw The procedure was the same as that adopted in Example 1. Microscopic examination of the dry product indicated the particle size lay in the region 40 to 200 $\mu$.

Example 4

The following ingredients were employed:

Vinyl chloride 700 pbw
Distilled water 2,714 pbw
Polyvinyl chloride latex-
  emulsifying agent, ammonium
  stearate — solids content, 33%
  - particle size, 0.05 to 0.3
  microns. 84 pbw
Styrene/acrylonitrile copolymer
  latex — solids content, 50% —
  emulsifying agent, a rosin acid
  salt. 56 pbw
Polyvinyl alcohol (Elvanol 50-42) 3.5pbw
Aqueous acetic acid (10% w/w) 4 pbv
Lauroyl Peroxide 2 pbw The procedure was the same as that adopted in example 1 except that the polymerization time was 16 hours. A granular product was obtained which had good plasticizer up-take.

Example 5

The following ingredients were employed:

Vinyl chloride 470 pbw
Distilled water 2,580 pbw
Polyvinyl chloride latex —
  emulsifying agent, ammonium
  stearate —solids content 33% — particle size, 0.05 to 0.3 microns- 650 pbw
Polyvinyl alcohol (Elvanol 50-42) 7 pbw
Lauroyl peroxide 2 pbw
Aqueous acetic acid (10% w/w) 26 pbv
Aqueous sodium hydroxide (10%
  w/w) 0.4pbv The polyvinyl alcohol was dissolved in the distilled water and the sodium hydroxide solution added. The latex was added and the mixture was poured into a stainless steel reactor. The lauroyl peroxide was added and the reactor closed, purged with nitrogen and evacuated. The vinyl chloride was sucked into the reactor and the mixture stirred at 120 r.p.m. for 40 minutes, during the last 10 minutes of which, the acetic acid solution was pumped in. The stirrer speed was increased to 700 r.p.m. and the mixture heated at 60°C for 6 hours. The reactor was then cooled and excess vinyl chloride vented to the atmosphere. The product was removed, filtered, washed in the filter and dried in a vacuum oven at 45°C for 48 hours. Microscopic examination indicated that the particle size of the dried product lay between 400 and 800 $\mu$.

Example 6

The following ingredients were employed:

Vinyl chloride 700 pbw
Distilled Water 2,576 pbw
Polyvinyl chloride latex —
  emulsifying agent ammonium
  stearate — solids content, 33%
  - particle size, 0.05 to
  0.3microns. 336 pbw
Polyvinyl alcohol (Elvanol 50-42) 7 pbw
Aqueous sodium hydroxide (10%
  w/w) 0.4 pbv
Aqueous acetic acid (10% w/w) 16 pbv
Lauroyl Peroxide 2 pbw The procedure used was the same as that described in Example 5. Microscopic examination of the dried product indicated that the particle size lay between 150 and 250$\mu$.

Example 7

The following ingredients were employed:

Vinyl chloride 700 pbw
Distilled water 800 pbw
Polyvinyl chloride latex as used in
  Examples 5 and 6 2,000 pbw
Polyvinyl alcohol (Elvanol 50-42) 21 pbw
Aqueous acetic acid (10% w/w) 40 pbv
Lauroyl Peroxide 2 pbw
Aqueous sodium hydroxide (10%
  w/w) 0.4 pbv The same procedure as described in Example 5 was employed except the polymerization time was three hours. Microscopic examination of the dried product indicated that the particle sizes lay in the range 50 to 250 $\mu$.

Example 8

The following ingredients were employed:

Vinyl chloride 4,000 pbw
A polyvinyl chloride latex -
  emulsifying agent, ammonium
  stearate - solids content, 33% by
  weight. 11,000 pbw
Distilled water 5,000 pbw
Polyvinyl alcohol (Alcotex 88-10) 70 pbw
Aqueous acetic acid (10% w/w) 650 pbv
Lauroyl peroxide 10 pbw The polyvinyl alcohol was dissolved in the water and poured into the reactor. The latex and lauroyl peroxide were added and the reactor was sealed and pressure tested. The reactor was purged and evacuated and the vinyl chloride was sucked in. The mixture was stirred at 160 r.p.m. for 20 minutes. During the last 10 minutes, the acetic acid was pumped into the reactor. The stirrer speed was then increased to 700 r.p.m. and the charge heated at 60°C for 10 hours. After cooling the reactor, excess vinyl chloride was vented off.

The product was separated and washed in a basket centrifuge. It was then dried in an air-circulating overn. Microscopic examination showed that the particles were in the range 40–200$\mu$. This product and blends of this product with a conventional suspension polymerized polyvinyl chloride sold under the trade name Breon 115 were tested for fusion times in a Brabender Plasticorder with the following results. The blend also contained stearic acid 1.25 percent and a tin stabilizer (Mellite 31)1.5 percent:

| Percentage of product in blend | Fusion Time Minutes |
| --- | --- |
| 0 | 54 |
| 5 | 35 |
| 10 | 25 |
| 15 | 15 |
| 20 | 12 |
| 30 | 7 |
| 40 | 4 |
| 50 | 3 |
| 70 | 2.5 |
| 100 | 1 |

I claim:

1. A process for the preparation of a polymer composition which comprises mixing a vinyl chloride polymer in the form of an aqueous latex stabilized by means of a carboxylic acid salt emulsifying agent with monomeric material comprising vinyl chloride, and, either prior to or after said mixing, destroying the emulsifying agent without substantially altering the size of the polymeric particles, allowing particles to pass into the monomeric material and polymerizing the monomeric material with said particles dispersed therein.

2. A process as claimed in claim 1 wherein the emulsifying agent is a water soluble salt of a saturated fatty acid containing from eight to 20 carbon atoms.

3. A process as claimed in claim 1, wherein the emulsifying agent is destroyed by the addition of a relatively strong acid to the system.

4. A process as claimed in claim 1 wherein the vinyl chloride polymer is polyvinyl chloride or a copolymer of vinyl chloride containing up to 20 percent by weight of copolymerizable material.

5. A process as claimed in claim 1, wherein the monomeric material consists of vinyl chloride.

6. A process as claimed in claim 1 wherein the monomeric material is polymerized under suspension polymerization conditions in the presence of the aqueous phase of the vinyl chloride polymer latex.

* * * * *